US007656786B2

(12) United States Patent
Strohmer et al.

(10) Patent No.: US 7,656,786 B2
(45) Date of Patent: Feb. 2, 2010

(54) METHOD FOR PULSE SHAPE DESIGN FOR OFDM

(75) Inventors: Thomas Strohmer, Palo Alto, CA (US); Paulraj Arogyaswami, Stanford, CA (US)

(73) Assignees: The Board of Trustees of the Leland Stanford Junior University, Palo Alto, CA (US); The Regents of the University of California, Oakland, CA (US)

(*) Notice: Subject to any disclaimer, the term of this patent is extended or adjusted under 35 U.S.C. 154(b) by 899 days.

(21) Appl. No.: 11/169,500

(22) Filed: Jun. 28, 2005

(65) Prior Publication Data
US 2006/0039270 A1 Feb. 23, 2006

Related U.S. Application Data

(60) Provisional application No. 60/583,741, filed on Jun. 28, 2004.

(51) Int. Cl.
*H04J 9/00* (2006.01)
(52) U.S. Cl. ................... 370/208; 370/260
(58) Field of Classification Search ......... 370/203–211, 370/343, 480, 481, 482, 485, 478; 375/260, 375/261
See application file for complete search history.

(56) References Cited

U.S. PATENT DOCUMENTS 5,790,516 A * 8/1998 Gudmundson et al. ...... 370/210
6,278,686 B1 * 8/2001 Alard .......................... 370/204
6,584,068 B1 * 6/2003 Alard .......................... 370/208
7,054,658 B1 * 5/2006 Lobo ........................ 455/553.1

OTHER PUBLICATIONS

Bölcskei et al., Communications 1999 ICC '99. 1999 IEEE International Conference on Vancouver, BC, Canada Jun. 6-10, 1999, *IEEE.*, pp. 559-564 (1999).
Hartmann et al., Acoustics Speech, and Signal Processing, IEEE International Conference on Montreal Canada May 17-24, 2004, *IEEE*, 3:805-808 (2004).
Jung et al., Acoustics Speech, and Signal Processing Advances in Wireless Communications, IEEE 5th Workshop Lisbon Portugal Jul. 11-14, 2004, pp. 368-372 (2004).
Janssen, et al., "Equivalence of two methods for constructing tight Gabor frames". IEEE Signal Processing Letters, vol. 7 No. 4 (Apr. 2000).

* cited by examiner

*Primary Examiner*—Jason E Mattis
*Assistant Examiner*—Dady Chery
(74) *Attorney, Agent, or Firm*—Perkins Coie LLP

(57) ABSTRACT

A computationally efficient pulse shaping method for OFDM that produces mutually orthogonal transmission pulses having fast spectral decay is provided. The pulse shaping method comprises an iterative method for designing OFDM transmission pulses that satisfy prescribed time-frequency localization conditions. The iterative method may be implemented in a computationally efficient way and can be used to adapt the transmission pulses to time-varying channel conditions in real-time, thereby maximizing the bit-error performance of an OFDM system while maintaining high data rates in wireless transmission.

37 Claims, 5 Drawing Sheets

METHOD FOR PULSE SHAPE DESIGN FOR OFDM

CROSS REFERENCE TO RELATED APPLICATIONS

This application claims priority to U.S. Provisional Application No. 60/583,741, entitled "Method for Pulse Shape Design For OFDM" and filed on Jun. 28, 2004, the entire disclosure of which is incorporated herein by reference.

FIELD OF THE INVENTION

This invention relates generally to the wireless transmission and broadcasting of digital or analog data. More specifically, the invention provides a method of pulse shaping for data transmission in an OFDM-based communications system.

BACKGROUND OF THE INVENTION

Advances in communications and digital multimedia technologies have fueled the demand for faster and more efficient wireless transmission of voice, data, and video on a global basis. Wireless transmission of information is accomplished by sending an information signal from a source to a destination via a wireless channel, which is a band of frequencies in the electromagnetic spectrum capable of serving as a transmission medium and carrying an information signal. Typically, the usable range of the electromagnetic spectrum allocated for wireless channels on any communication system is limited. For wireless phone systems, for example, the total bandwidth allocated is typically on the order of 50 MHz. As a result, multicarrier communication techniques and multiple access communication techniques capable of sharing and allocating the spectrum efficiently among many channels (multicarrier techniques) and many users (multiple access techniques) are required.

Multicarrier techniques are used in wireless communication systems to improve the bandwidth efficiency and reduce the intersymbol interference of the system. These techniques divide the usable spectrum among many channels and transmit data with multiple carriers. Multiple access techniques are used to increase the number of users that may access the wireless services provided by the system at any given time. Multicarrier and multiple access techniques can also be combined to serve many users simultaneously and provide them with the bandwidth efficiency and wireless services they so desire.

An example of a multicarrier technique include Orthogonal Frequency Division Multiplexing ("OFDM"). Examples of multiple access techniques include Frequency Division Multiple Access ("FDMA"), Time Division Multiple Access ("TDMA"), and Code Division Multiple Access ("CDMA") and its many variations. Examples of combined multicarrier/multiple access techniques include Orthogonal Frequency Division Multiple Access ("OFDMA"), Multicarrier Code Division Multiple Access ("MC-CDMA"), and Multicarrier Direct Sequence CDMA ("Multicarrier DS-CDMA"), Among the multicarrier and multiple access techniques available today, OFDM and OFDMA have emerged as attractive and powerful choices due to their robustness against multipath fading and high spectral efficiency. OFDM is currently used in the European digital audio and video broadcasting standards, and in digital terrestrial TV broadcasting. OFDM-based hybrid multiple access systems such as MC-CDMA are being considered for third-generation wireless communications systems. The wireline digital subscriber line ("DSL") is based on OFDM. OFDM also outperforms FDMA and TDMA under many channel conditions, and is capable of outperforming CDMA in both single and multi-cellular-based systems.

OFDM achieves high spectral efficiency by dividing the available spectrum into multiple narrowband channels having carriers that are overlapping and orthogonal. Each carrier is at a different frequency and modulated by a given data symbol representing the information to be transmitted. The particular way in which the information is represented depends on the modulation scheme used, which may include phase shift keying ("PSK") and its common variations such as differential phase shift keying ("DPSK") and quadrature phase shift keying ("QPSK"), and quadrature amplitude modulation ("QAM"), among others.

A schematic diagram of a wireless communication system employing OFDM is shown in FIG. 1. The transmitted information signal consists of a linear combination of translations in the time-frequency space of a prototype pulse shape $\psi$ defining the carriers, i.e., $$x(t) = \sum_{k,l} c_{k,l} \psi(t - kT) e^{2\pi i l F t} \tag{1}$$

where $C_{k,l}$ are the information-bearing data symbols, chosen from some finite alphabet constellation of a given modulation scheme, T is the symbol period and F is the separation between the multiple carriers. With W denoting the total bandwidth available for transmission, then N=W/F denotes the number of carriers used in the system.

The time-frequency translations of the prototype pulse shape $\psi$ defining the carriers may be denoted by $\psi_{k,l}$ as:

$$\psi_{k,l}(t) = \psi(t-kT) e^{2\pi i l F t} \tag{2}$$

A function family of pulse shapes identifying the OFDM system may therefore be represented by the triple $(\psi, F, T)$.

A necessary condition for perfect reconstruction of the transmitted signal at the receiver is that the functions $\psi_{k,l}$ are linearly independent (regardless of whether they are orthogonal or not), which implies that $TF \geq 1$. The OFDM system $(\psi, F, T)$ is orthogonal if the following condition is satisfied:

$$\langle \psi_{k,l}, \psi_{m,n} \rangle = \begin{cases} 1, & \text{if } k = m \text{ and } l = n \\ 0 & \text{else} \end{cases} \tag{3}$$

where $\langle \psi, \phi \rangle$ denotes the inner product between two functions $\psi$ and $\phi$.

The orthogonality of the functions $\psi_{k,l}$ is not a requirement for perfect reconstruction at the receiver, but minimizes the error caused by additive white Gaussian noise ("AWGN"). The spectral efficiency $\rho$ of the OFDM system in terms of data symbols transmitted per second per Hertz ("Hz") is approximately given by $\rho=1/(TF)$. Since $TF \geq 1$, the maximal spectral efficiency of an OFDM system is given by $\rho=1$.

Ideally, one would like to construct an OFDM system $(\psi, F, T)$ that satisfies the following three conditions simultaneously: (1) the functions $\psi_{k,l}$ should be orthogonal; (2) the pulse shape $\psi$ should be well localized in time and frequency; and (3) TF=1, that is, the OFDM should have maximal spectral efficiency. The first condition, as mentioned above, is desired because of the error minimization in the presence of AWGN. The second condition, that of good time-frequency localization, is important because it leads to the use of a simple equalizer and reduces timing errors effects, frequency offset error effects as well as out-of-band interference, i.e., the leakage of signal energy outside the assigned transmission bandwidth. And the third condition is important as it enables the OFDM system to utilize the allocated spectrum efficiently.

As is well known in the art, the three conditions cannot be satisfied simultaneously due to the Balian-Low theorem. This is the case even if the orthogonality condition is relaxed in favor of biorthogonality, which would increase the sensitivity of the OFDM system to AWGN. As a result, OFDM systems available today employ a number of techniques to achieve the conditions above while attempting to optimize other factors in the system, such as intersymbol interference ("ISI"), interchannel interference ("ICI") Doppler effect, delay spread and overall system performance in the presence of fading. ISI is caused by time dispersion due to multipath propagation, and ICI results from frequency distortion due to the Doppler effect.

Standard OFDM systems use rectangular pulse shapes and employ a guard interval or cyclic prefix to combat ISI. The main problem with OFDM systems using a guard interval or cyclic-prefix is that the pulse shapes are poorly localized in the frequency domain, which severely limits their performance characteristics in wireless channels and leads to complicated and expensive equalizer design. Additionally, the use of guard intervals or cyclic-prefix does not reduce ICI. This can result in additional loss of spectral efficiency since the carrier signals cannot be placed across the entire available spectrum. If filtering is applied to reduce ICI, the carrier signals are no longer orthogonal, which increases interference and reduces performance. OFDM systems that use a guard interval or cyclic prefix have TF>1 and thus achieve a spectral efficiency of less than 1, typically $\rho=3/4$ or $4/5$.

To address the drawbacks of using a guard interval or cyclic-prefix in an OFDM system, pulse-shaping OFDM systems have been proposed. The idea is to construct pulse shapes $\psi_{k,l}$ that are well-localized in some sense in time and in frequency, in order to combat both ISI and ICI. For example, U.S. Pat. No. 5,790,516 describes pulse shaping methods that are based on a simple filtering of the transmission signal. The methods described therein, however, do not preserve the orthogonality of the pulses $\psi_{k,l}$ and therefore result in interference between the pulses, leading to a loss of performance in the system.

Other pulse shaping methods described in the prior art, for example, those described in U.S. Pat. No. 6,278,686 and U.S. Pat. No. 6,584,068, are very restrictive, as they are only designed for Offset-QAM OFDM ("OQAM/OFDM") and thus for a very limited choice of the parameters T and F. Although OQAM/OFDM maintains maximal spectral efficiency and allows for pulse shapes that are well localized in the time-frequency domain, it leads to increased complexity of the receiver. Furthermore, the pulse shaping methods described in these patents lead to pulses that are of infinite support in time and in frequency, which makes them of limited use in practice. In addition, those methods are not capable of constructing pulses that obey a prescribed spectral mask or a prescribed number of taps.

In view of the foregoing, there is a need in this art for a pulse shaping method for OFDM that combats both intersymbol and interchannel interference while maintaining high spectral efficiency.

There is a further need in this art for a pulse shaping method for OFDM that produces mutually orthogonal transmission pulses that have a prescribed number of taps and show fast spectral decay.

There is also a need in this art for a pulse shaping method for OFDM that is computationally efficient and produces orthogonal pulse shapes that are well localized in time and in frequency.

SUMMARY OF THE INVENTION

In view of the foregoing, one aspect of the present invention provides a pulse shaping method for OFDM that combats both intersymbol and interchannel interference while maintaining high spectral efficiency.

A further aspect of the present invention provides a pulse shaping method for OFDM that produces mutually orthogonal transmission pulses that have a prescribed number of taps and show fast spectral decay.

Another aspect of the present invention provides a pulse shaping method for OFDM that is computationally efficient and produces orthogonal pulse shapes that are well localized in time and in frequency.

These and other aspects of the present invention are accomplished by providing a computationally efficient pulse shaping method for OFDM that produces mutually orthogonal transmission pulses having a prescribed number of taps and fast spectral decay. The transmission pulses provide good protection against both intersymbol interference ("ISI") and interchannel interference ("ICI"), while maintaining high spectral efficiency and efficient bandwidth management.

The pulse shaping method comprises an iterative method for designing OFDM transmission pulses $\psi_{k,l}$ such that the triple $(\psi,F,T)$ forms an orthogonal OFDM system and the transmission pulses $\psi_{k,l}$ satisfy prescribed time-frequency localization conditions. These conditions can be, for example, a fixed number of taps or a prescribed spectral mask.

The iterative method may be implemented in a computationally efficient way by using Newton's method and Fast Fourier Transforms ("FFTs"). The computationally efficient implementation is based on a link between OFDM systems and Gabor frames and can be used to adapt the transmission pulses to time-varying channel conditions in real-time, thereby maximizing the bit-error performance of the OFDM system while maintaining high data rates in wireless transmission. The method may also be used to generate transmission pulses for a wide range of spectral efficiencies.

Advantageously, the pulse shaping method of the present invention may be used in many applications, including, but not limited to, wireless communications with moving transmitter and/or receiver at high bit rates or at low bit rates using a simple equalizer design, multicarrier systems in which the transmission pulses have to satisfy strict spectral constraints such as ultrawideband communication systems, multiuser communications systems such as TDMA and FDMA, digital broadcasting with moving bodies, digital wireline communications such as VDSL, underwater communications, and offset-QAM OFDM systems, among others. In addition, the method reduces equalizer complexity at the receiver in case of Doppler spread, reduces timing errors as well as frequency offset errors, and enables better spectrum management by reducing both ISI and ICI.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which.

DETAILED DESCRIPTION OF EMBODIMENTS OF THE INVENTION

Generally, the present invention provides a pulse shaping method for OFDM and OFDMA. OFDM, as used herein, refers to orthogonal frequency division multiplexing for transmission of information signals. An information signal refers to a voice, data, audio, imagery, or video signal, or any other type of signal representing content. The information signal represents content by means of binary symbols, with each symbol having one or more bits.

Information signals according to the present invention are transmitted by modulating carriers at different frequencies. The carriers are represented by a pulse shape, also referred to herein as a transmission pulse, designed in the present invention to form an orthonormal system. A pulse shape, as used herein, comprises a time-frequency localized signal, such as a Gaussian-type pulse or a raised cosine pulse.

Aspects of the present invention provide for the iterative design of a pulse shape that has a prescribed number of taps and has a fast spectral decay. Fast spectral decay in this context may be the spectral decay of a raise cosine function (which has cubic decay) or even faster, such as exponential decay. The iterative design method generates the pulse shape from an initial pulse shape by applying a method described in T. Strohmer and S. Beaver, "Optimal OFDM system design for time-frequency dispersive channels," IEEE Trans. Comm., 51(7):1111-1122, 2003, incorporated herein by reference. The iterative design method may be implemented in a computationally efficient way by using Newton's method and Fast Fourier Transforms ("FFTs").

Figure 1:
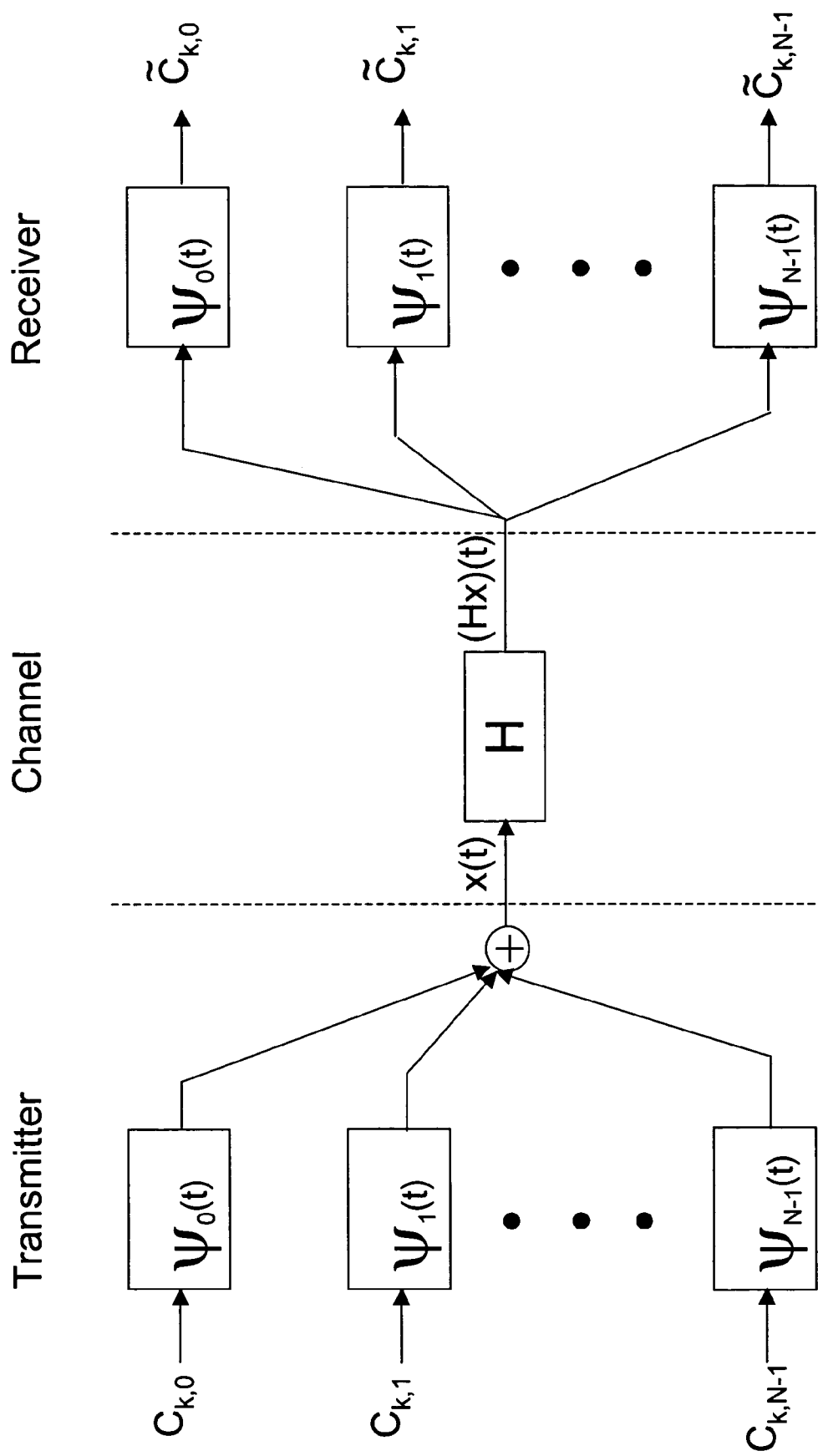
FIG. 1 is an exemplary diagram of a prior-art wireless communication system employing OFDM.
Figure 2:
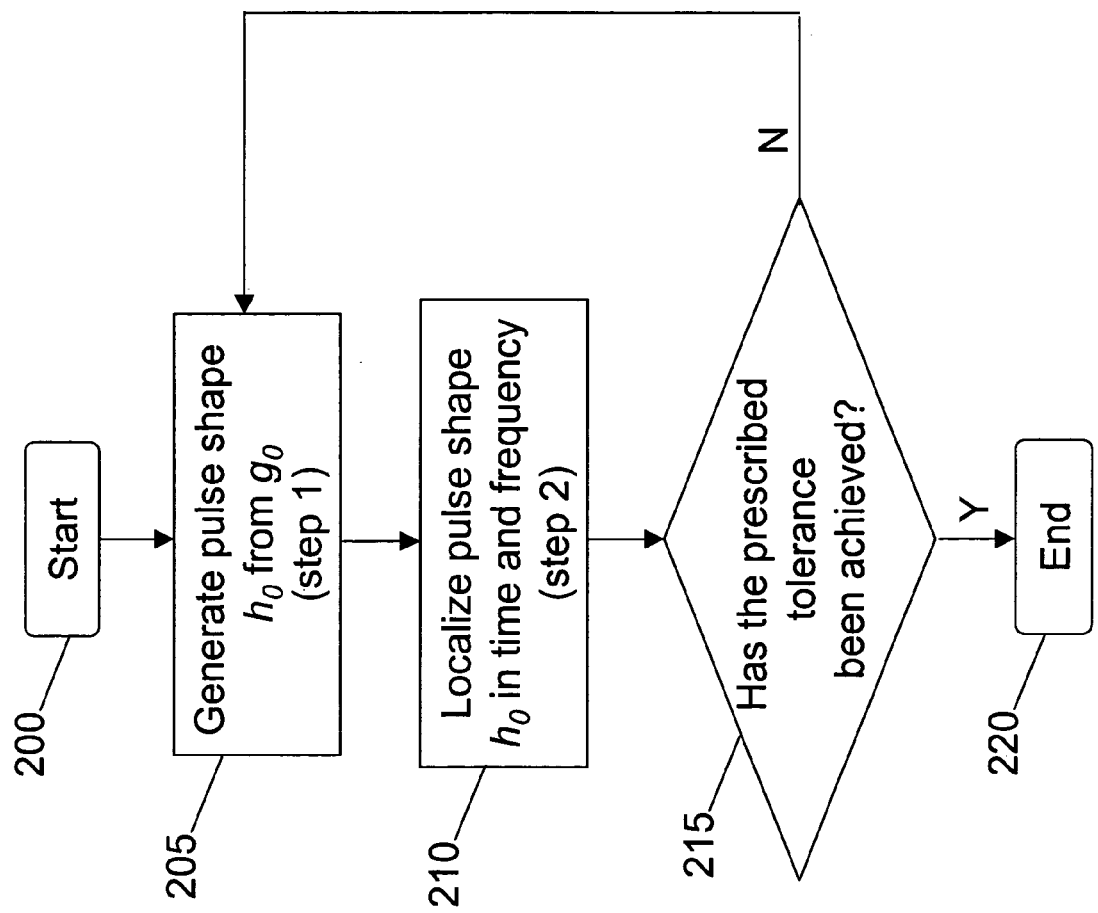
FIG. 2 is a flow chart illustrating exemplary method steps for designing mutually orthogonal pulse shapes according to the principles and embodiments of the present invention.

Referring now to FIG. 2, a flow chart illustrating exemplary method steps for designing mutually orthogonal pulse shapes according to the principles and embodiments of the present invention is described. At step 205, an initial pulse shape $g_0$ is chosen and a pulse shape $h_0$ is generated from $g_0$ by applying a method described in T. Strohmer and S. Beaver, "Optimal OFDM system design for time-frequency dispersive channels," IEEE Trans. Comm., 51(7):1111-1122, 2003, incorporated herein by reference. Pulse shape $h_0$ is optimally close to initial pulse shape $g_0$ and generates a set of mutually orthogonal transmission pulses. Step 205 is described in more detail hereinbelow with reference to FIG. 3.

At step 210, pulse shape $h_0$ is localized in time and frequency by applying a time-frequency localization operator. Since this operation will destroy the orthogonality of the OFDM transmission pulses, at step 215 the method iterates between steps 205-210 until a prescribed tolerance given by the required noise floor of the OFDM system is achieved. At this point the iterations are stopped and a pulse shape that satisfies the prescribed time-frequency localization properties and at the same time forms an orthonormal system is generated. Steps 210-215 are described in more detail hereinbelow with reference to FIG. 4.

Figure 3:
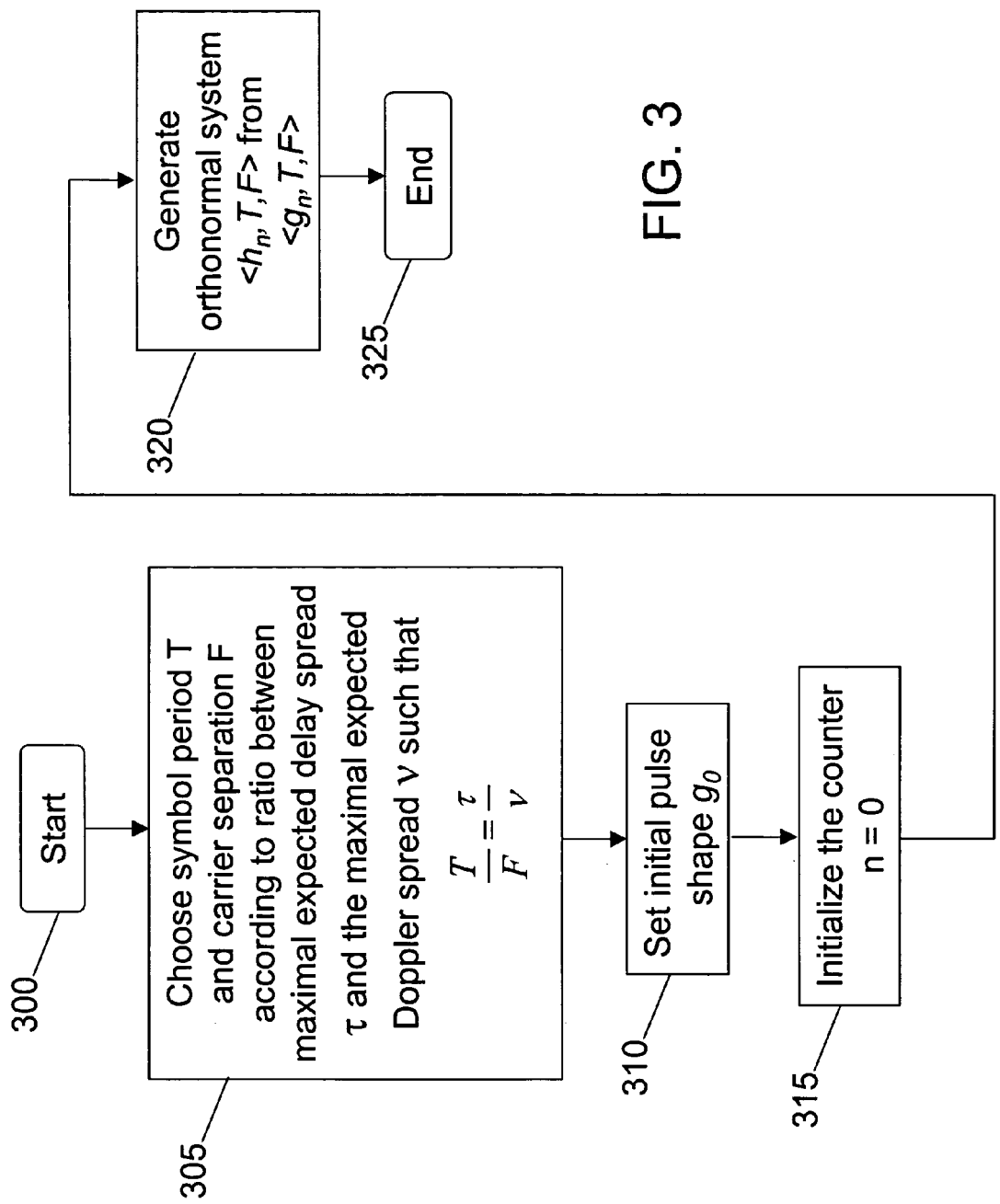
FIG. 3 is a flow chart illustrating exemplary method steps for generating an orthonormal system based on an initial pulse shape according to the principles and embodiments of the present invention.

Referring now to FIG. 3, a flow chart illustrating exemplary method steps for generating an orthonormal system based on an initial pulse shape according to the principles and embodiments of the present invention is described. The pulse shape design method utilizes the following standard design parameters for OFDM: (1) symbol period T; (2) carrier separation F; (3) number of carriers N; and (4) required noise floor of $\epsilon$ dB. If estimates of the maximal expected delay spread $\tau$ and the maximal expected Doppler spread $\nu$ are known a priori, which is usually the case in most OFDM-based communication systems, then T and F are chosen at step 305 such that:

$$\frac{T}{F} = \frac{\tau}{\nu} \tag{4}$$

At step 310, an initial pulse shape $g_0$ is chosen. The initial pulse shape $g_0$ may be a Gaussian-type pulse $g_0(t)=e^{-\alpha\pi t^2}$ where $\alpha=F/T$, or a raised cosine pulse. The initial OFDM system ($g_0$,T,F) is in general not an orthogonal system. At step 315, a counter is initialized at n=0. At this point, $g_n=g_0$.

At step 320, for a given $g_n$, an orthonormal OFDM system ($h_n$,T,F) is constructed from ($g_n$,T,F) by applying a method described T. Strohmer and S. Beaver, "Optimal OFDM system design for time-frequency dispersive channels," IEEE Trans. Comm., 51(7):1111-1122, 2003, incorporated herein by reference, as follows:

$$h_n = \sum_{k,l} R_{k,l,0,0}^{-\frac{1}{2}}(g_n)(g_n)_{k,l} \tag{5}$$

where $$R_{k,l,k',l'}^{-\frac{1}{2}}(g_n) = \langle (g_n)_{k',l'}, (g_n)_{k,l} \rangle \tag{6}$$

The existence of $R^{-1/2}$ ($g_n$) follows from the positive-definiteness of R($g_n$), which in turn follows from the condition that ($g_n$,T,F) be linear independent. In addition, pulse shape $h_n$ computed in Equation (5) is optimally close to $g_n$ in the sense that it minimizes the energy $\|g_n-h_n\|_2$.

Equation (5) above is computationally expensive but may be solved very efficiently by using Newton's method. First, set $g_n^{(0)}=g_n$ and for j=0, 1, . . . , compute iteratively:

$$g_n^{(j+1)} = \frac{1}{2}\left(\frac{g_n^{(j)}}{\|g^{(j)}\|} + \frac{U^{(j)}g^{(j)}}{\|U^{(j)}g^{(j)}\|}\right) \tag{7}$$

where the operator $U^{(j)}$ is defined by:

$$U^{(j)}g^{(j)} = \sum_{k,l} R_{k,l,0,0}^{-1}(g^{(j)})g_{k,l}^{(j)} \tag{8}$$

and R($g_n^j$) is given by Equation (6) above.

Computing $g^{(j)}$ with the Newton's method above will converge to $h_n$ for increasing j. A few iterations are usually sufficient for convergence. The inversion of R($g_k$) can be done numerically very efficiently by a method described in T. Strohmer, "Numerical algorithms for discrete Gabor expansions," in H. G. Feichtinger and T. Strohmer, editors, Gabor Analysis and Algorithms: Theory and Applications, chapter 8, pages 267-294, Birkhäuser, Boston, 1998, the entire content of which is incorporated herein by reference.

The method described therein may be adapted to pulse shaping design for OFDM by utilizing a link between OFDM systems and Gabor frames. An OFDM system may be interpreted as an undersampled or critically sampled orthogonal Gabor system. If (g,a,b) is a tight Gabor frame which has excellent time-frequency localization, that is, if ab>1, then (g,T,F) with T=1/b and F=1/a is an OFDM system with excellent time-frequency localization.

A tight Gabor frame can be constructed from a given Gabor frame (g,a,b) via a canonical tight window defined as $S^{-1/2}g$. As pointed out in T. Strohmer and S. Beaver, "Optimal OFDM system design for time-frequency dispersive channels," IEEE Trans. Comm., 51(7):1111-1122, 2003, incorporated herein by reference, $S^{-1/2}g$ may be equivalently expressed as:

$$S^{-1/2}g = \sum_{k,l} R^{-1}_{k,l,0,0}(g) g_{k,l} \quad (9)$$

where the $g_{k,l}$ are associated with the system (g,1/b,1/a) and R(f) is defined by Equation (6) above with T=1/b and F=1/a.

The proposed method steps expressed in Equation (5) is therefore equivalent to computing the left-hand side of Equation (9). That is, computing $h_n$ in Equation (5) is equivalent to computing $S^{-1/2}g$ in Equation (9).

It has been shown in T. Strohmer, "Rates of convergence for the approximation of dual shift-invariant systems in $l^2Z$," J. Four. Anal. Appl., 5(6):599-615, 2000, incorporated herein by reference, that an arbitrarily accurate approximation to Gabor frame operator S can be derived by a periodic finite-dimensional model in $C^L$. By doing so, Gabor frame operator S may be factorized as:

$$S = I_p \otimes diag\left(C_0, \ldots, C_{\frac{L}{pq}-1}\right) \quad (10)$$

where S is a L×L matrix representing the Gabor frame operator S, $$\frac{L}{ab} \equiv : \frac{p}{q}$$

with p, q being relative prime integers, and the q×q submatrices $C_j$ are given by:

$$diag\left(C_{\frac{bk}{q}}, \ldots C_{\frac{b(k+1)}{q}-1}\right) = \left(F_{\frac{b}{q}} \otimes I_q\right) * B_k \left(F_{\frac{b}{q}} \otimes I_q\right) \quad (11)$$

where $$F_{\frac{b}{q}}$$

is the Discrete Fourier Transform ("DFT") of size $$\frac{b}{q} \times \frac{b}{q}$$

and the b×b matrices $B_k$ are given by:

$$(B_k)_{mn} = S_{k+mL/b, k+nL/b} \quad (12)$$

for m, n=0, . . . , b−1, k=0, . . . , L/b−1.

Hence, the Gabor frame operator S may be efficiently factorized into Fast Fourier Transforms ("FFTs") and simple permutations into L/(pq) different submatrices of size q×q where each of these submatrices is repeated p times. Since permutations are performed simply by data addressing, the whole inversion of S can be done very efficiently and hence, as computation of $h_n$ is equivalent to computation of $S^{-1/2}g$, the computation of $h_n$ can therefore be done very efficiently.

Figure 4:
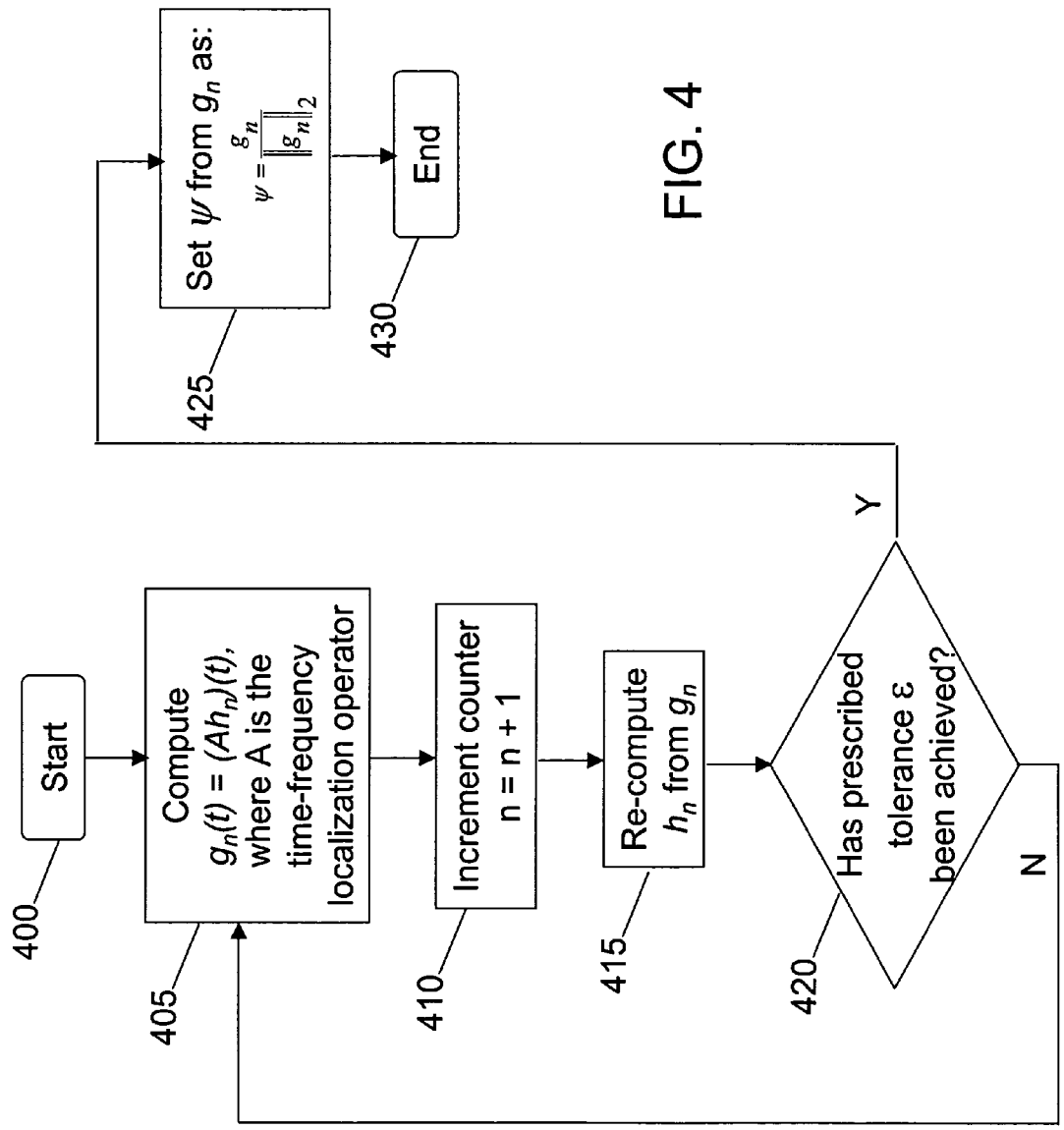
FIG. 4 is a flow chart illustrating exemplary method steps for enforcing time-frequency localization conditions to the pulse shapes according to the principles and embodiments of the present invention.

The resulting pulse shapes $\{(h_n)_{k,l}\}$ form an orthonormal system. However, $h_n$ will not in general obey the desired time-frequency localization conditions. Referring now to FIG. 4, a flow chart illustrating exemplary method steps for enforcing time-frequency localization conditions to the pulse shapes according to the principles and embodiments of the present invention is described. At step 405, time-frequency localization conditions are applied to the computed pulse shape $h_n$ by multiplying $h_n$ by a time-frequency localization operator as follows:

$$g_n(t) = (Ah_n)(t) \quad (13)$$

where A is the time-frequency localization operator.

Time-frequency localization operator A may be used to ensure that pulse shape $h_n$ has a fixed number of taps or a specific spectral mask. To enforce a given number of taps in pulse shape $h_n$, A may defined as follows:

$$(A\psi)(t) = \begin{cases} \psi(t) & \text{for } 0 \leq t \leq \Delta - 1 \\ 0 & \text{else} \end{cases} \quad (14)$$

To comply with FCC regulations and other standards, it is often required that transmission signals obey a certain spectral decay. To enforce that pulse shape $h_n$ will have a specific spectral mask, A may defined as follows:

$$(A\psi)(t) = V_\omega^{-1}[(V_\omega\psi)(t,\omega) \cdot F(t,\omega)] \quad (15)$$

where $V_\omega$ is the short-time Fourier transform defined in Equation (16) below and F(t,ω) determines the temporal and spectral properties of $h_n$. For example, F(t,ω) may be given by F(t,ω)=$w_1$(t)$w_2$(ω), where $w_1$ and $w_2$ are Hamming-type windows, or $w_1$ could be a Gaussian function and $w_2$ could be a function whose shape is determined by a specific spectral mask corresponding to FCC standards, such as those for transmission pulses in ultrawideband communications.

The short-time Fourier transform ("STFT") of a function h with respect to a window function w is defined by:

$$V_w h(t,\omega) = \int\int h(t)\omega(s-t)e^{-2\pi i \omega s} ds \quad (16)$$

where ω is typically a Gaussian-type function.

While setting $g_n(t)=(Ah_n)(t)$ ensures that pulse shape $g_n$ will satisfy the time-frequency localization conditions imposed by time-frequency localization operator A, ($g_n$,T,F) may no longer generate an orthonormal system. Therefore, at step 410, the counter is incremented by 1, that is, n=n+1, and $h_n$ is recomputed at step 415 by using $g_n$ as its initial pulse shape. Pulse shape $h_n$ is recomputed from $g_n$ as described hereinabove with reference to step 320 of FIG. 3.

The method then repeats steps 405-415 until a prescribed tolerance given by the required OFDM noise floor of ε is achieved at step 420 at a given iteration, say at iteration n=n*. For example, the tolerance criterion could be specified as follows:

$$\sum_{m \neq k, n \neq l} |\langle \Psi_{k,l}, \Psi_{m,n} \rangle| \leq \varepsilon \quad (17)$$

At this point, the iterations terminate and the desired pulse shape designed according to the principles and embodiments of the present invention is set at:

$$\psi = \frac{g_{n*}}{\|g_{n*}\|_2} \quad (18)$$

where the denominator denotes the 2-norm of $g_{n*}$:

$$\|g_{n*}\|_2 = (\int |g_{n*}(t)| dt)^{1/2} \quad (19)$$

By construction, the designed pulse shape ψ satisfies the prescribed time-frequency localization properties and at the same time forms an orthogonal OFDM system given by (ψ, T, F).

The number of iterations required to reach step 425 depends on the choice of the time-frequency localization operator A. If the range of A is a convex set or a linear subspace, then convergence can be shown using methods known in the art for alternating projection algorithms.

It should be understood by one skilled in the art that orthogonality of the pulse shapes $\psi_{k,l}$ is not a strict requirement for perfect reconstruction of the data even though it minimizes the error caused by AWGN. If the constructed pulse shapes $\psi_{k,l}$ are not orthogonal due to a too early termination of the iterations or other reasons, then the receiver pulse shapes may employ a biorthogonal set of pulse shapes $\phi_{m,n}$ for a given pulse shape φ. Two function systems $\{\psi_{k,l}\}$ and $\{\phi_{m,n}\}$ are biorthogonal if the following condition is satisfied:

$$\langle \psi_{k,l}, \varphi_{m,n} \rangle = \begin{cases} 0 & \text{if } k = m \text{ and } l = n, \\ 1 & \text{else} \end{cases} \quad (20)$$

In this case, receiver pulse shapes $\phi_{k,l}$ may be computed in a number of ways, for example, as:

$$\varphi = \sum_{k,l} R_{k,l,0,0}^{-1}(\psi) \psi_{k,l} \quad (20)$$

Computation of φ can be done very efficiently by using the link to Gabor frames as described hereinabove. Other possibilities for computing φ may be used, which are analogous to the computation of general dual windows for Gabor frames, as described in T. Strohmer, "Numerical algorithms for discrete Gabor expansions," in H. G. Feichtinger and T. Strohmer, editors, Gabor Analysis and Algorithms: Theory and Applications, chapter 8, pages 267-294, Birkhäuser, Boston, 1998, incorporated herein by reference.

It should also be understood by one skilled in the art that carrier functions for OQAM/OFDM may be constructed from pairwise combining the carrier functions of a standard pulse shaping OFDM system with parameters T.F=2.

Figure 5:
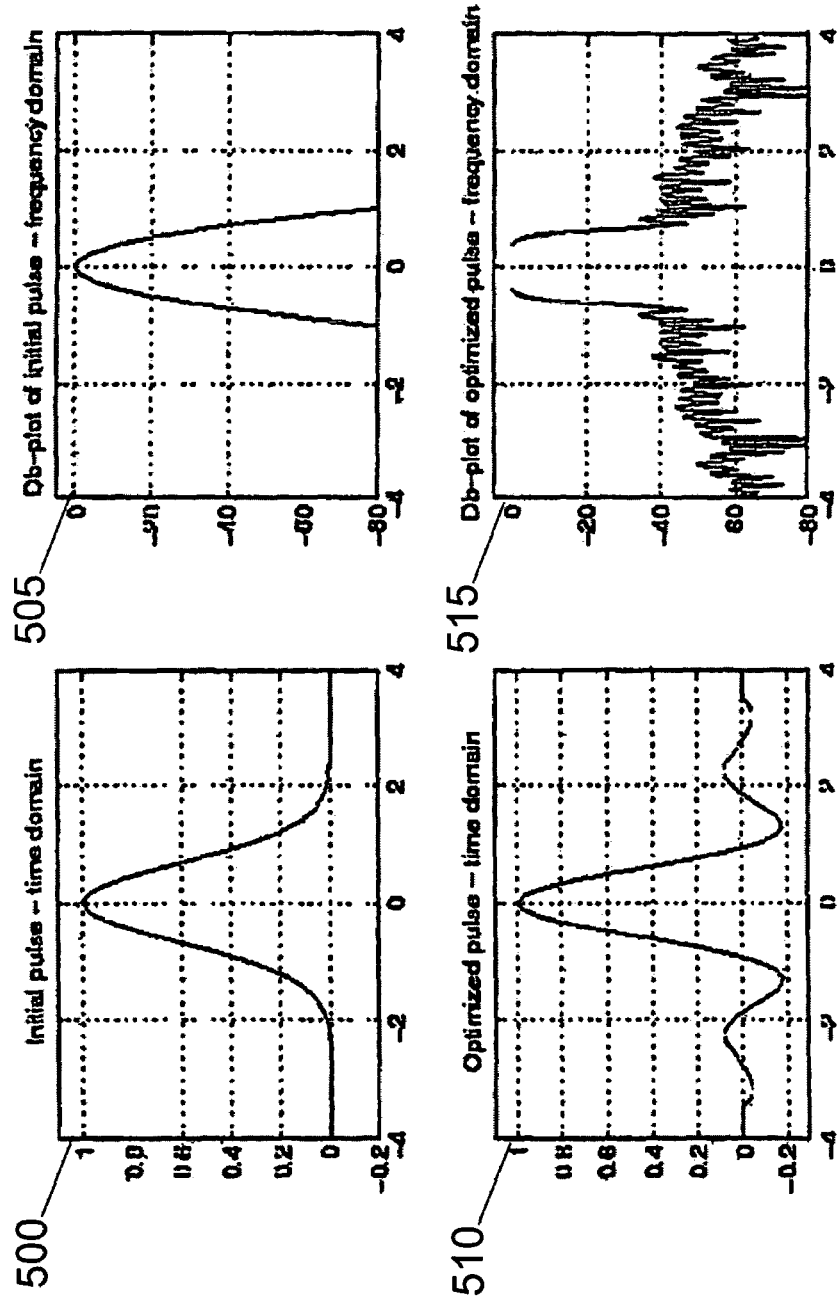
FIG. 5 shows time and frequency plots of a pulse shape designed according to the principles and embodiments of the present invention.

Referring now to FIG. 5, time and frequency plots of a pulse shape designed according to principles and embodiments of the present invention are described. Plots 500-515 were produced by generating an OFDM pulse shape for an OFDM system with the following specifications: (1) T=1 nanosecond; (2) F=1.33 GHz; (3) ϵ=40 dB; (4) ρ=¾; and (5) number of taps=55, which corresponds to a pulse duration of less than 7 nanoseconds. The time-frequency localization operator was chosen as in Equation (14) and the pulse shape was designed according to the method steps described hereinabove with reference to FIGS. 2-4.

As illustrated in FIG. 5, while the initial pulse shape plotted in plots 500-505 has fast temporal and spectral decay, it does not generate an orthogonal system nor does it have a finite number of taps. Using this initial pulse shape in an OFDM system would lead to severe ISI and ICI. However, the pulse shape designed by the present invention and plotted in plots 510-515 has a finite number of taps, is highly localized in the time and frequency domains and generates an orthogonal system.

The foregoing descriptions of specific embodiments and best mode of the present invention have been presented for purposes of illustration and description only. They are not intended to be exhaustive or to limit the invention to the precise forms disclosed. Specific features of the invention are shown in some drawings and not in others, for purposes of convenience only, and any feature may be combined with other features in accordance with the invention. Steps of the described processes may be reordered or combined, and other steps may be included. The embodiments were chosen and described in order to best explain the principles of the invention and its practical application, to thereby enable others skilled in the art to best utilize the invention and various embodiments with various modifications as are suited to the particular use contemplated. Further variations of the invention will be apparent to one skilled in the art in light of this disclosure and such variations are intended to fall within the scope of the appended claims and their equivalents.

What is claimed is:

1. A method for orthogonal frequency division pulse shape design comprising:
    (a) providing a first pulse shape;
    (b) generating a second pulse shape derived from the first pulse shape;
    (c) localizing the derived second pulse shape in time and in frequency using a localization operator to generate a current localized derived second pulse shape; and
    (d) repeating steps (b) and (c) iteratively using the current localized derived second pulse shape to generate a new localized pulse shape as the first pulse shape until a prescribed tolerance associated with an orthogonal frequency division noise floor is achieved and the new localized derived second pulse shape has fast spectral decay and generates a set of transmission pulses that are mutually orthogonal with respect to time and frequency shifts along a prescribed time-frequency lattice.

2. The method of claim 1, wherein the first pulse shape is one of a Gaussian pulse and a raised cosine pulse.

3. The method of claim 1, wherein the generating step comprises choosing a symbol period and a carrier separation based on a ratio between a maximal expected delay spread and a maximal expected Doppler spread.

4. The method of claim 3, wherein the second pulse shape is part of an orthogonal system having a symbol period and carrier separation and wherein the second pulse shape has minimal energy among all pulse shapes that form the orthogonal system with respect to the symbol period and the carrier separation.

5. The method of claim 1, wherein repeating steps (b) and (c) until a prescribed tolerance is achieved and the second pulse shape has fast spectral decay and generates a set of transmission pulses that are mutually orthogonal with respect to time and frequency shifts along a prescribed time-frequency lattice, comprises generating mutually orthogonal transmission pulses that are optimally time-frequency localized.

6. The method of claim 1, wherein the generating step comprises applying the vector or matrix valued version of Newton's method for constructing pulse shapes that are orthogonal with respect to time-frequency shifts along a prescribed time-frequency lattice.

7. The method of claim 1 wherein localizing the second pulse shape in time and in frequency comprises applying a time-frequency localization operator to the second pulse shape.

8. The method of claim 7, wherein the time-frequency localization operator comprises an operator for fixing the number of taps of the second pulse shape.

9. The method of claim 7, wherein the time-frequency localization operator comprises an operator for specifying the spectral mask of the second pulse shape.

10. The method of claim 1, wherein the repeating step comprises recomputing the second pulse shape from the first pulse shape at each iteration.

11. The method of claim 1, wherein the first pulse shape has a 2-norm, further comprising generating a third pulse shape from the first pulse shape by dividing the first pulse shape by the 2-norm of the first pulse shape.

12. The method of claim 11, further comprising generating a receiver pulse shape from the third pulse shape, wherein the receiver pulse and the third pulse shape are biorthogonal with respect to time and frequency shifts along a prescribed time-frequency lattice.

13. The method of claim 1, further comprising applying second pulse shape in an orthogonal quadrature amplitude modulation/orthogonal frequency division multiplexing communications system.

14. The method of claim 1, wherein the step (c) of localizing of the second pulse shape in time and in frequency, further comprises: multiplying the second pulse shape by a time-frequency localization operator to generate a localized second pulse shape.

15. The method of claim 1, wherein the prescribed tolerance is a prescribed tolerance given by the required noise floor of the orthogonal frequency division multiplexing system in which the transmission pulses are to be used.

16. The method of claim 1, wherein the time shift (T) and the frequency shift (F) have an arbitrary value, including arbitrary values where the product (T×F) of time shift×frequency shift (TF) of an underlying time-frequency lattice is an arbitrary value and where the arbitrary value is not equal to 2.

17. The method of claim 1, wherein the product or time shift×frequency shift (TF) of an underlying time-frequency lattice is an arbitrary value.

18. The method of claim 17, wherein the arbitrary value (TF) includes values not equal to 2.

19. The method of claim 1, wherein the transmission pulses that are mutually orthogonal with respect to time and frequency shifts along a prescribed time-frequency lattice are pulses $\Psi_{k,l}$ that are mutually orthogonal, such that their pair-wise inner products satisfy the condition:

$$<\Psi_{k,l},\Psi_{m,n}>=1 \text{ if } k=m \text{ and } l=n; \text{ and } =0 \text{ else.}$$

20. A method for orthogonal frequency division multiplexing (ODFM) pulse shape design comprising: iteratively generating from a first pulse shape, at least one derived second successive pulse shape that is localized in time and in frequency using a localization operator and that achieves a prescribed tolerance associated with an ODFM noise floor, wherein the at least one derived successive pulse shape is used to generate mutually orthogonal transmission pulses that are well localized in time and frequency, are mutually orthogonal with respect to time and frequency shifts along a prescribed time-frequency lattice, and have fast spectral decay.

21. The method of claim 20, wherein iteratively generating from a first pulse shape, at least a second successive pulse shape used to generate mutually orthogonal transmission pulses, comprises providing a first pulse shape and iteratively generating a second pulse shape from the first pulse shape.

22. The method of claim 21, wherein the pulse shape is one of a Gaussian pulse and a raised cosine pulse.

23. The method of claim 21, wherein iteratively generating a second pulse shape from the first pulse shape comprises choosing a symbol period and a carrier separation based on a ratio between a maximal expected delay spread and a maximal expected Doppler spread.

24. The method of claim 21, wherein iteratively generating a second pulse shape from the first pulse shape comprises applying the vector or matrix valued version of Newton's method for constructing pulse shapes that are orthogonal with respect to time-frequency shifts.

25. The method of claim 21, wherein the first pulse shape has a 2-norm, further comprising generating a third pulse shape from the first pulse shape by dividing tie first pulse shape by the 2-norm of the first pulse shape.

26. The method of claim 21, further comprising applying the second pulse shape in an orthogonal quadrature amplitude modulation/orthogonal frequency division multiplexing communications system.

27. A method for orthogonal frequency division multiplexing (OFDM) pulse shape design comprising:
  (a) providing an initial pulse shaping function;
  (b) generating a derivative pulse shaping function from the initial pulse shaping function;
  (c) multiplying the derivative pulse shaping function by a time-frequency localization operator to generate a localized derivative pulse shaping function; and
  (d) repeating steps (b) using the localized derivative pulse shaping function as the initial pulse shaping function. and (c) until a prescribed tolerance given by the OFDM noise floor is achieved and the localized derivative pulse shaping function generates a set of mutually orthogonal transmission pulses having fast spectral decay that are mutually orthogonal with respect to time and frequency shifts along a prescribed time-frequency lattice.

28. The method of claim 27, wherein the generating step comprises choosing a symbol period and a carrier separation based on a ratio between a maximal expected delay spread and a maximal expected Doppler spread.

29. The method of claim 28, wherein the derivative pulse shaping function is part of an orthogonal system having a symbol period and carrier separation and wherein the derivative pulse shaping function has minimal energy among all pulse shapes that form the orthogonal system with respect to the symbol period and the carrier separation.

30. The method of claim 27, wherein repeating steps (b), using the localized derivative pulse shaping function as the initial pulse shaping function, and (c) until a prescribed tolerance given by the OFDM noise floor is achieved and the localized derivative pulse shaping function generates a set of mutually orthogonal transmission pulses having fast spectral decay comprises generating mutually ort orthogonal transmission pulses that are optimally time-frequency localized.

31. The method of claim 27, wherein the time-frequency localization operator comprises an operator for specifying the spectral mask of the derivative pulse shaping function.

32. The method of claim 27, wherein the localized derivative pulse shaping function has a 2-norm, further comprising generating a final pulse shaping function from the localized derivative pulse shaping function by dividing the localized derivative pulse shaping function by the 2-norm of the localized derivative pulse shaping function.

33. The method of claim 32, further comprising generating a receiver pulse shaping function from the final pulse shaping function, wherein the receiver pulse shaping function and the final pulse shaping function are biorthogonal.

34. The method of claim 27, further comprising applying localized derivative pulse shaping function in an orthogonal quadrature amplitude modulation/orthogonal frequency division multiplexing communications system.

35. The method of claim 27, wherein the derivative pulse shaping function is used in generating a set of transmission pulses that are mutually orthogonal.

36. The method of claim 27, wherein the localized derivative pulse shaping function is used in generating a set of transmission pulses that are well localized in time and in frequency but may no longer be orthogonal.

37. The method of claim 27, wherein the transmission pulses that are mutually orthogonal with respect to time and frequency shifts along a prescribed time-frequency lattice are pulses $\Psi_{k,l}$ that are mutually orthogonal, such that their pairwise inner products satisfy the condition:

$$<\Psi_{k,l},\Psi_{k,l}>=1 \text{ if } k=m \text{ and } l=n; \text{ and } =0 \text{ else.}$$

* * * * *

UNITED STATES PATENT AND TRADEMARK OFFICE
CERTIFICATE OF CORRECTION

PATENT NO. : 7,656,786 B2
APPLICATION NO. : 11/169500
DATED : February 2, 2010
INVENTOR(S) : Strohmer et al.

It is certified that error appears in the above-identified patent and that said Letters Patent is hereby corrected as shown below:

In column 1 after the section entitled CROSS REFERENCE TO RELATED APPLICATIONS and at line 11 please add the following:

--GOVERNMENT INTEREST
This invention was made with government support under grant number DMS-9973373 awarded by the National Science Foundation. The government has certain rights in the invention.--

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,656,786 B2  Page 1 of 1
APPLICATION NO. : 11/169500
DATED : February 2, 2010
INVENTOR(S) : Strohmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1190 days.

Signed and Sealed this

Twenty-eighth Day of December, 2010

David J. Kappos
*Director of the United States Patent and Trademark Office*